United States Patent [19]

Duggan

[11] 4,251,918
[45] Feb. 24, 1981

[54] EXTENSOMETER

[76] Inventor: Michael F. Duggan, 3029 Greer Rd., Palo Alto, Calif. 94303

[21] Appl. No.: 99,315

[22] Filed: Dec. 3, 1979

[51] Int. Cl.³ .................................................. G01B 5/00
[52] U.S. Cl. ................................................... 33/148 D
[58] Field of Search ............ 33/143 C, 147 D, 148 D; 73/760, 856, 860, 781, 782

[56] References Cited

U.S. PATENT DOCUMENTS

| | | | |
|---|---|---|---|
| 2,416,664 | 2/1947 | Ruge | 33/147 D |
| 2,611,966 | 9/1952 | Rebman | 73/760 X |
| 2,663,085 | 12/1953 | Ruge | 33/147 D |
| 2,666,262 | 1/1954 | Ruge | 33/148 D |
| 2,744,181 | 5/1956 | Rea | 73/781 X |
| 2,921,282 | 1/1960 | Krouse et al. | 33/147 D X |

*Primary Examiner*—Harry N. Haroian

[57] ABSTRACT

A strain gage extensometer used for measuring uniaxial and biaxial strains in material test specimens. The extensometer is composed of two independent axial strain measuring sensors joined together by a resilient member which is instrumented to provide transverse strain data. All compliant, instrumented members are coupled to the deformations of the specimen, which thus causes strain in the instrumented members which is sensed by suitable strain gages and instruments. A special attachment mechanism is provided by the thin, parallel elements machined into one of the sensors.

1 Claim, 6 Drawing Figures

EXTENSOMETER

FIELD OF THE INVENTION

This invention relates to strain measuring extensometers, and more particularly to such devices which incorporate strain sensors mounted on flexible, resilient members such that strains occurring in two perpendicular directions in the specimen material are measured.

PRIOR ART

In the prior art there have been strain measuring extensometers with flexure elements, and with strain gage sensing means. However, these devices have a single flexible member oriented so as to sense specimen deformation in a single direction only. Most of these devices require additional clip mechanisms to secure the extensometer to the specimen material. Many of these devices incorporate mechanical means to establish reference dimensions when attached to the test article. Many of these instruments contain components so arranged as to cause backlash, making them unsuitable for fatigue strain measurements.

SUMMARY OF THE INVENTION

The present invention relates to extensometers for measuring and detecting strains in specimens, such devices in particular including two geometrically opposing sensor members, each containing a resilient compliant arm and a rigid arm. The outward regions of the arms are designed and constructed to move with the specimen when the specimen is subjected to strain in its principal (longer) direction, thus causing the flexible resilient members to be subjected to bending. Strain gages are mounted on the resilient arms in a suitable arrangement so as to provide electrical output proportional to strain in these flexible members which has been caused by deformation of the specimen. The strain gages are connected to known readout circuitry for determining the strain.

In addition, the present device has a resilient member joining the two sensors together at their ends farthest removed from the specimen region. This spring member is elastically deformed to allow the extensometer to be attached to the test specimen. Strain gages suitably mounted upon this flexible member provide an indication of transverse strain in the specimen which causes this member to bend as that deformation occurs. This indication is provided at the same time, and in addition to, the strain indicated by the aforementioned pair of flexible arms sensors.

Another important feature of the present device is the inclusion of thin parallel blades machined into a single arm of one of the two axial strain measurement sensors of which the transducer is assembled. This machined leg of that sensor is rigid in the direction in which its contiguous flexible arm deflects to measure specimen axial strain, but is compliant in the transverse direction to effect an easily regulated balancing force so that the transducer can be easily attached to the specimen with contact force equally distributed among the pointed screws touching the specimen.

The extensometer is fabricated of high strength material such as heat treated steel such that it is not damaged or deformed in normal operation and can remain affixed to the specimen through rupture, with release then being automatic. The extensometer requires no stops or bars for establishing reference gage length, nor are over travel stops required in the preferred embodiment of the device because of the high strength material construction and automatic breakaway action. The unit is easy to make and has cone-point screws for engaging the specimen, which can be replaced when necessary.

The transducer has a high natural frequency in all members instrumented with strain gages. This makes the device usable for fatigue testing at normal test frequencies below 100 Hz because the extensometer components are not excited to resonance.

DESCRIPTION OF THE PREFERRED EMBODIMENT OF THE EXTENSOMETER

Figure 1:
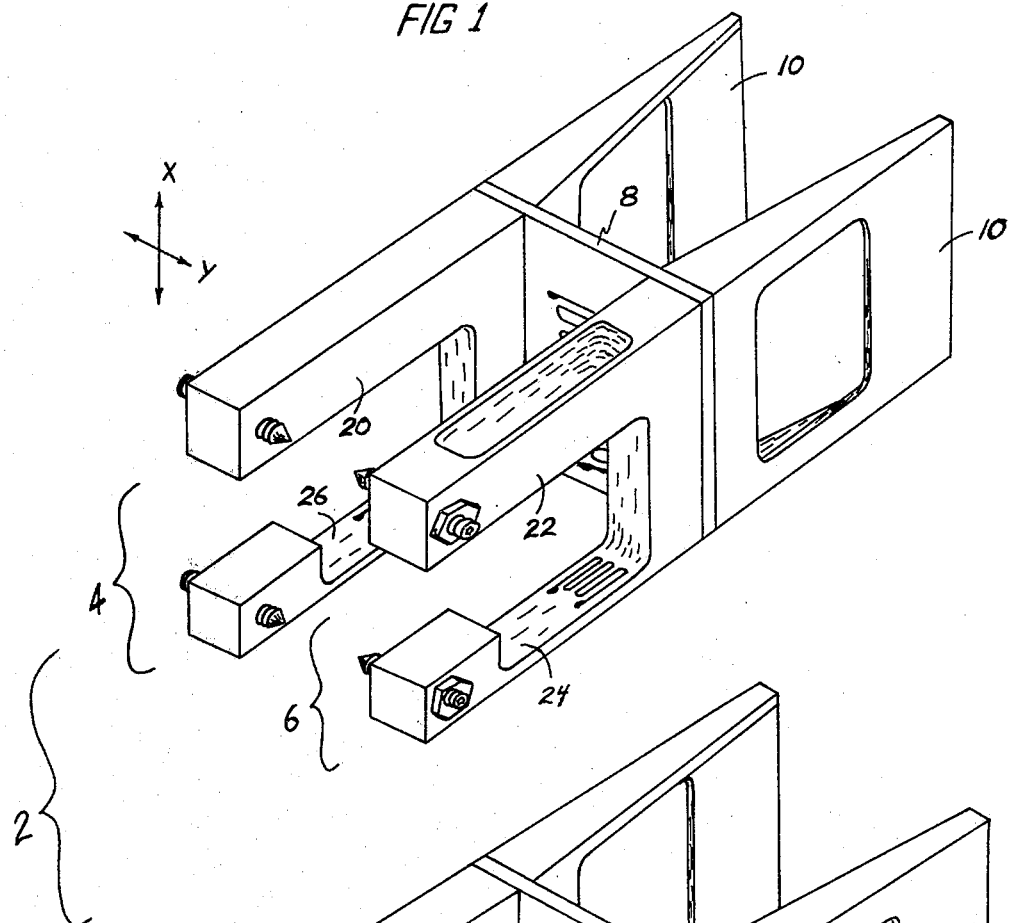
FIG. 1 is a perspective view of the extensometer in its preferred embodiment.
Figure 2:
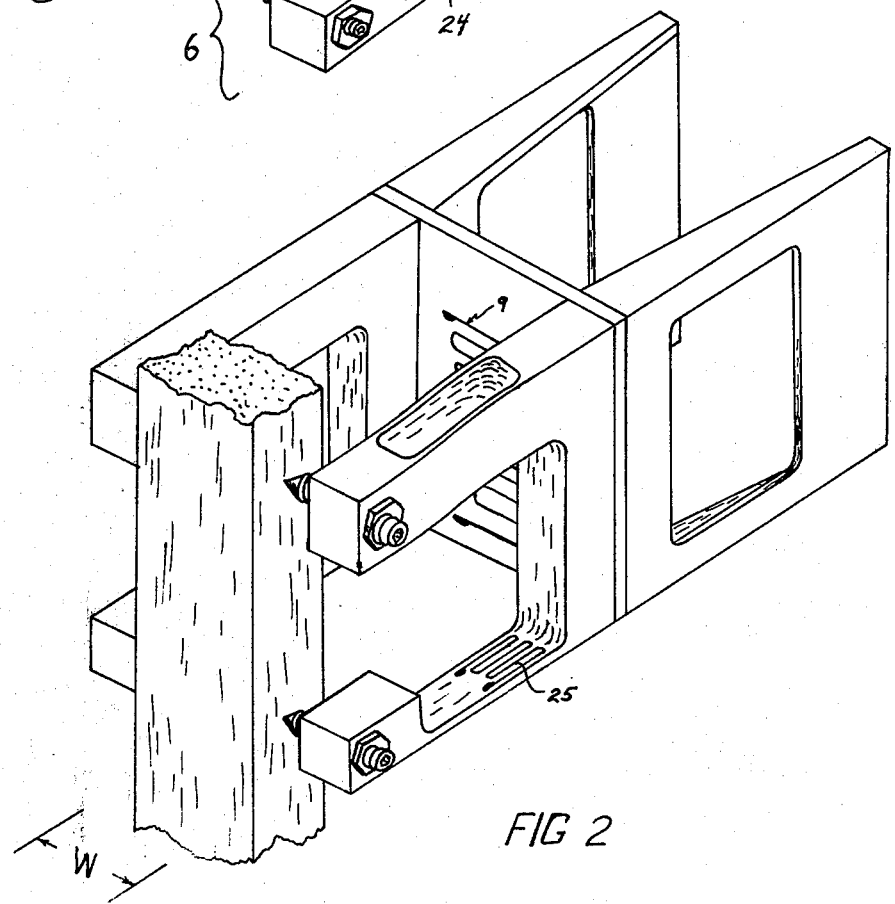
FIG. 2 is a perspective view of similar orientation with the extensometer shown mounted upon a test specimen.
Figure 3:
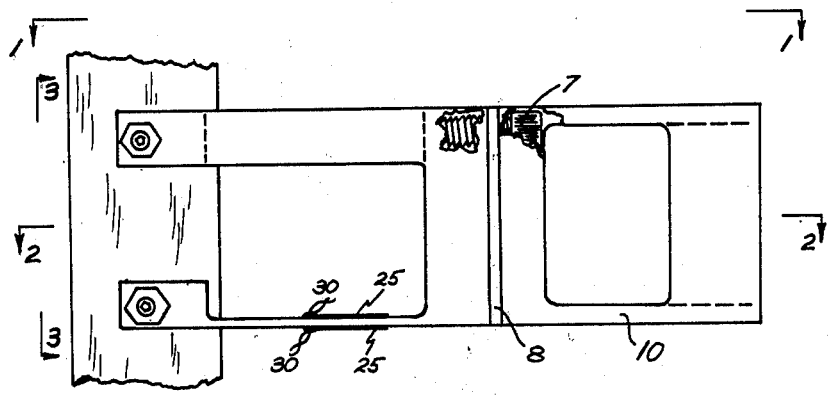
FIG. 3 is a side view of the extensometer.
Figure 4:
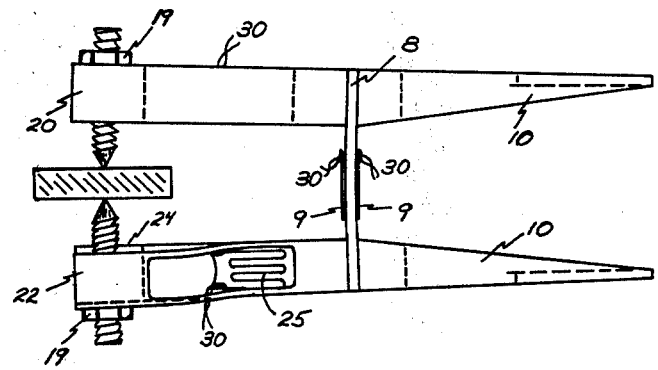
FIG. 4 is a top view of the extensometer taken on line 1—1 in FIG. 3.
Figure 5:
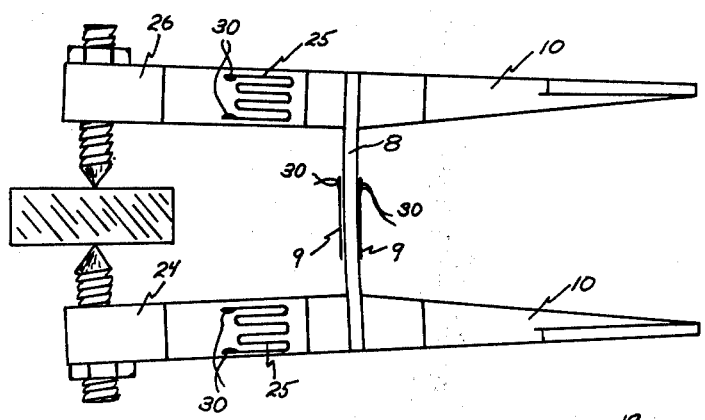
FIG. 5 is a sectional view taken on line 2—2 in FIG. 3.

In FIG. 1, an extensometer assembly 2 is illustrated. The extensometer is comprised of sensor element 4 and sensor element 6 each fabricated from a unit of material such that each is not assembled from component parts. Element 8 is a thin, flexible and resilient material containing through holes situated to align with two threaded holes in each of sensors 4 and 6 for purpose of joining the pieces together by suitable cap screws 7. Arms 10 are of similar construction one to the other and contain drilled and counterbored holes to receive the cap screws. Thus, the transducer 2 is assembled by means of four cap screws, the heads being housed within arms 10, passing through spring element 8, and threading tightly into sensors 4 and 6. Each sensor 4 and 6 include a pair of precisely positioned threaded holes for mounting cone-pointed screws 12, 14, 16 and 18 and locking nuts 19 which serve to contact the specimen material at exactly defined position. This arrangement is illustrated in FIG. 2. Arm 20 of sensor 4 and arm 22 of sensor 6 are rigid in direction X. Arm 22 of sensor 6 is flexible in direction Y. Arm 26 of sensor 4 and arm 24 of sensor 6 are flexible in direction X in order to respond to specimen strain, but are constructed of material of such strength to insure that no permanent deformation might occur from service operation which could alter per-established dimensions separating point 12 from point 16, or point 14 from point 18.

Figure 6:
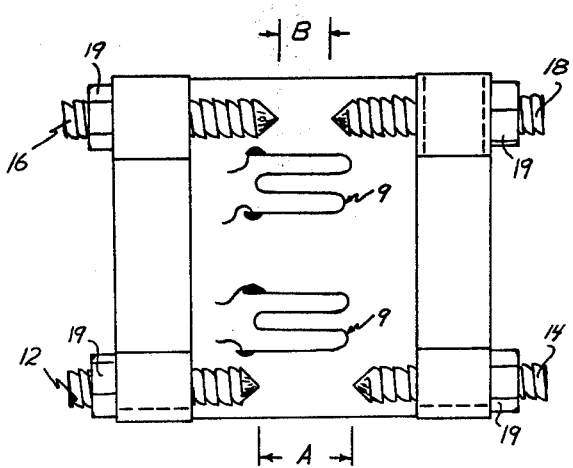
FIG. 6 is a view taken on line 3—3 in FIG. 3 (without the test specimen).

Attachment is accomplished by squeezing the ends of members 10 toward one another to deform spring member 8 such that dimensions A and B (FIG. 6) temporarily become greater than the thickness W of the specimen material. After release, cone-point screws 12, 14, 16 and 18 contact against the specimen material at the urging of resilient spring member 8. To guarantee that points 12, 14, 16 and 18 react against the specimen material with equal force, thus preventing possible slippage, the machined leg region 22 is forced to deform in the Y directio when point 18 contacts the specimen. The Y direction deformation is many times that experienced by points 12, 14 or 16 which are mounted in legs intentionally rigid in direction Y. Prior to deformation of spring member 8, dimension B is smaller than dimension A, both of which are less than the specimen thickness W. Dimension B is adjusted by an operator skilled in the use of such devices until the deflection of that leg housing point 18 causes points 16 and 18 to react approximately half of the force created by deforming spring 8 at the instant that points 12 and 14 come into contact with the specimen. The remainder of that force imposed by member 8 is then reacted between points 12 and 14, thus evenly dividing the total clamping force among the four pointed screws in contact with the specimen material. Attachment is thus accomplished by means of clamping forces self-supplied from the component pieces of the transducer and without additional clamps or springs.

Resilient legs 24 and 26 are permitted to deflect in direction Y when the specimen is deformed, thus providing compliant response proportional to axial specimen strain. These same legs, being rigid in direction Y, cause any transverse strain (strain in the Y direction) in the specimen material to impart deformation in resilient spring 8 which is suitably instrumented to accomplish transverse strain measurement.

A plurality of bonded resistance strain gages are mounted on resilient members 8, 24 and 26. Gages 25 on opposite sides of members 24 and 26 (usually 2) are physically oriented and electrically configured to provide maximum electrical signal in response to deflection of resilient members 24 and 26. Those gages 9 on member 8 (usually 4) are similarly arranged to maximize the electrical signal caused by flexure of member 8, resulting from the members' flexural response to specimen deformation in direction Y.

Suitable electrical leads 30 from the bonded strain gages lead to circuitry suitable for measuring strains, such as a bridge circuit. A wheatstone resistance bridge with excitation source and readout device is suitable for such purpose.

The extensometer is suitable for uniaxial and biaxial tensile tests, uniaxial and biaxial compression tests, fatigue and fracture tests, and displacement measurements of a general nature. Accuracy and comprehensive specimen strain characterization is accomplished because snesors 24 and 26, positioned on opposing surfaces of the test specimen, independently provide electrical signals proportional to their individual mechanical response. These can be monitored spearately and, when analyzed by those trained in the art of materials testing, provide information necessary for identifying the average, or midplane, specimen strain, and the difference between these outputs identifies bending strain. This information and the specimen Y direction strain indicated by instrumented spring 8 thus provide specimen material strain data in perpendicular, or biaxial, directions. The extensometer can be manufactured of any structural material. High strength steel is preferred so that danger of damage from handling or accident is minimized. Aluminum construction is also suitable in weight critical circumstances, provided that travel-limit stops are provided to prevent sensor damage. This insures that initial gage-length is unaltered and accurate which is required for calibration and operation. The cone-point screws are easily replaced by unscrewing and reinserting new units.

What is claimed

1. An extensometer for axial and transverse strain measurement of a test specimen comprising, a pair of U-shaped sensor elements each having a pair of parallel arms and a connecting base portion, said elements being secured by said base portions to one side of a single, flat, resilient leaf spring in spaced parallel relation, the free ends of each said arms having cone pointed screw means mounted thereon for contact with a test specimen positioned between the sensor elements, a pair of handle sections secured to the other side of the leaf spring adjacent said base portions, said handle sections and leaf spring acting to provide a clamping force of sufficient energy to cause the pointed screws to contact the specimen with pressure great enough to support the extensometer thereon, one arm of each sensor element comprising a long thin resilient blade having strain gages mounted thereon and adapted for flexing in an axial direction for indicating a deformation of the test specimen in the axial direction, one other arm of one of said sensor elements being rigid in the axial direction and a direction transverse thereto while the other arm of the other sensor element is rigid in the axial direction but compliant in the direction transverse thereto, said last mentioned arm being in the shape of two thin parallel blades, said flat spring having strain gages mounted thereon between the base portions for indicating a deformation of the test specimen in a direction transverse to said axial deformation.

* * * * *